Figure 1:
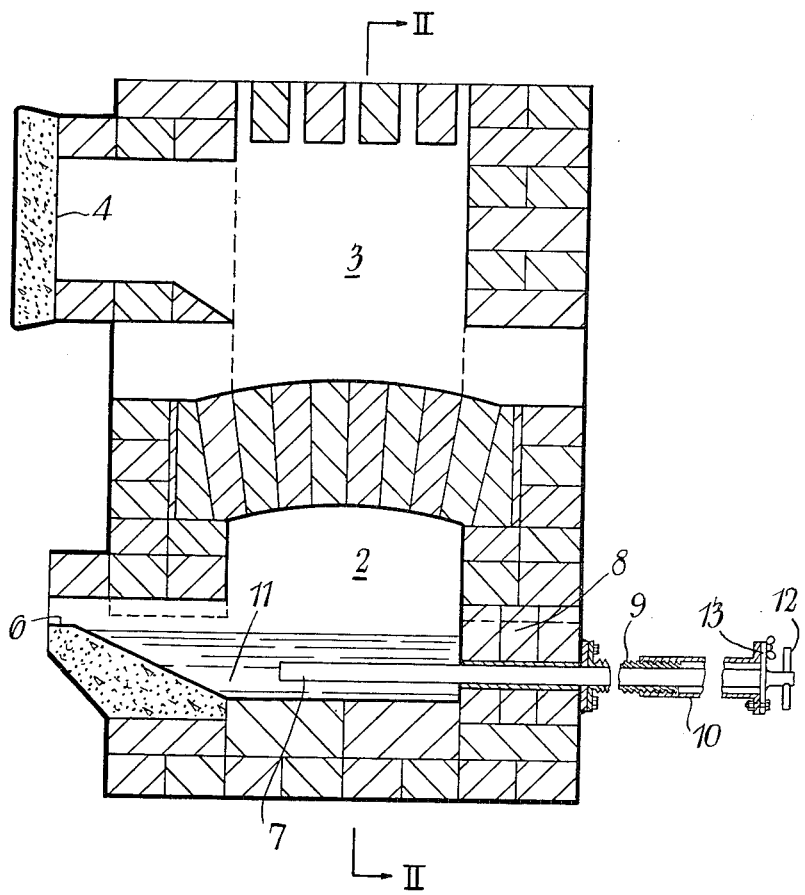

Nov. 2, 1965  F. P. GOLBY  3,215,422
REVERBERATORY FURNACES
Filed May 22, 1962  2 Sheets-Sheet 2

3,215,422
REVERBERATORY FURNACES
Frank Percival Golby, Cardiff, Wales, assignor to Sklenar Furnaces Limited, Cardiff, Wales
Filed May 22, 1962, Ser. No. 196,741
Claims priority, application Great Britain, Jan. 1, 1962, 52/62
6 Claims. (Cl. 266—34)

This invention concerns improvements relating to oil-fired or gas fired reverberatory furnaces used for the melting of iron and iron alloys, especially grey iron. An object of the invention is to provide a simple and effective method and means for the controlled introduction of carbon into iron or iron alloy in reverberatory furnaces.

In reverberatory furnaces, there has heretofore been a tendency for a small carbon loss to occur during melting. This decrease in carbon content may have a detrimental effect on the fluidity of the metal, making it more difficult to produce good sound castings.

A melt of grey or alloy iron carried out in a reverberatory furnace is covered by a thin film of slag originating from the refractory lining of the furnace, from impurities adhering to the iron and/or from oxides on the surface of the iron. This slag makes the effective addition of carbon difficult, as the slag adheres to the surface of any carbon thrown into the furnace. Even if carbon is forced by means of a rake under the level of the slag, or if the slag is momentarily skimmed back and the carbon then plunged by a rake beneath the surface of the metal, the carbon will nevertheless, due to its lower density, rise to the surface of the slag and thus be prevented from remaining in contact with the iron and, consequently, from being absorbed by the iron.

To illustrate the loss of carbon that can occur when melting grey iron in a reverberatory furnace, the following test was made: A charge of iron with a total carbon content of 2.3% was melted in a reverberatory furnace. On reaching a temperature of 1400° C., the metal was cast into sand pigs. After chilling back, the same metal was then remelted and recast six times in a similar manner.

The following total carbon contents were recorded:

| | Percent |
|---|---|
| Pig | 2.3 |
| After melting 1 | 2.27 |
| Melting 2 | 2.25 |
| Melting 3 | 2.24 |
| Melting 4 | 2.16 |
| Melting 5 | 2.05 |
| Melting 6 | 1.19 |

The loss of carbon is substantial.

According to the present invention, one or more carbon rods or like members, hereinafter referred to as rods, are inserted beneath the surface of the iron or iron alloy in the reverberatory furnace. Carbon supplied to the metal in this manner can readily be absorbed by the molten metal.

As an example of the effectiveness of this method, the above test was repeated with a charge of iron from the same source, i.e., with a total carbon content of 2.3%. With a single carbon rod immersed in the iron and taking the temperature of the iron in each melting to 1400° C., the following total carbon contents were recorded:

| | Percent |
|---|---|
| Pig | 2.3 |
| After melting 1 | 2.35 |
| Melting 2 | 2.39 |
| Melting 3 | 2.63 |
| Melting 4 | 2.81 |
| Melting 5 | 2.81 |
| Melting 6 | 2.82 |

The amount of the carbon addition can be controlled by varying the quantity of carbon immersed in the metal and/or by regulating the time for which such immersion takes place. Control is also possible by increasing the temperature of the metal. As, in most cases, it is desirable to work to a constant pouring temperature, however, the last variable, increased temperature, cannot be readily employed, as detrimental effects, such as shrinkage, may occur when castings are made.

To illustrate control by regulation of the time, two identical tests were carried out, using iron from the same source. In each case, the metal was taken to and held at a temperature of 1400° C./1425° C. for the duration of the test:

Test No. 1

A charge of iron was melted and 0.57% carbon in the form of a rod was immersed in the metal.

The following total carbon contents were recorded:

| After holding for— | Percent |
|---|---|
| 30 mins. | 2.09 |
| 60 mins. | 2.11 |
| 90 mins. | 1.98 |
| 120 mins. | 2.00 |
| 150 mins. | 2.06 |
| 180 mins. | 2.14 |
| 210 mins. | 2.28 |

Test No. 2

1.14% carbon was immersed in the metal.
The total carbon contents recorded were:

| After holding for— | Percent |
|---|---|
| 30 mins. | 2.11 |
| 60 mins. | 2.18 |
| 90 mins. | 2.2 |
| 120 mins. | 2.35 |
| 150 mins. | 2.36 |
| 180 mins. | 2.44 |
| 210 mins. | 2.49 |

In large foundries, it is common to use reverberatory furnaces as holding furnaces working in conjunction with cupolas or other melting furnaces, thereby ensuring that there is a reservoir of molten metal always available for production purposes. Prolonged holding periods such as are then involved can result in substantial carbon loss, particularly from the higher carbon-content irons. The present invention enables such losses to be corrected. For instance, a quantity of iron with a carbon content of 3.6/3.8 held in a reverberatory furnace was found to have a carbon loss of 0.26% after a period of 3 hours and 30 mins. With iron from the same source held for the same period and using the same furnace, but with 1% by weight of carbon immersed below the surface of the metal, a carbon gain of 0.04% was observed.

The tendency for iron melted in a reverberatory furnace to suffer a small loss of carbon has hitherto largely prevented the use of scrap iron such as can be used in cupola melting. Similarly scrap steel cannot readily be used as part of the charge, as this results in yet a further serious reduction of the carbon contents of the melt. The use of carbon rods in the manner set forth above permits the use of scrap iron or steel as part of the charge in a reverberatory furnace, the reduction of the carbon content being corrected by the said use of such rods.

Results such as can be achieved by the invention will be illustrated by a test in which a furnace was charged with 30% by weight of scrap steel, 10% by weight of iron filings and 60% of rust-covered scrap iron in the order stated. After the charge had been melted down, excess slag was taken off the top of the metal bath and the remaining slag was then thinned by the addition of limestone. Although at a temperature of 1450/1500° C., the metal was not sufficiently fluid for it to be possible to pour a sharp-edged casting. Carbon was added in the manner set forth above a total of 3% carbon being progressively added over a period of 150 minutes. After this period, a fluid grey iron was poured and a good sharp-edged machinable casting was produced.

Figure 2:
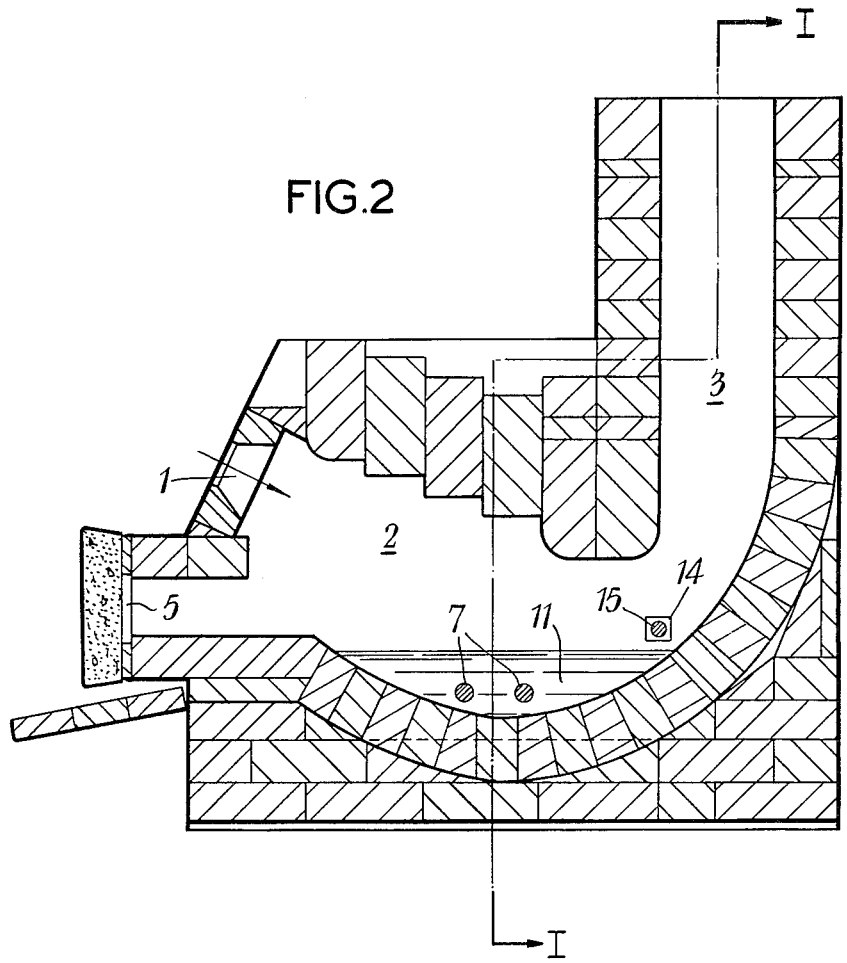

By way of example, one arrangement for carrying the invention into effect will now be more fully described with reference to the accompanying drawings, in which:

FIGURE 1 is a vertical section through a furnace on the line I—I in FIGURE 2, and FIGURE 2 is a cross section on the line II—II in FIGURE 1.

The reverberatory furnace illustrated has an oil or gas burner at 1 (FIGURE 2) firing into a combustion chamber 2 from which the products of combustion are discharged to atmosphere through a vertical flue 3. Metal introduced through a charging door at 4 (FIGURE 1) passes into and down through the flue 3 into the chamber 2. The furnace also has a slagging or alloying door at 5 (FIGURE 2) and a tapping spout 6 (FIGURE 1) from which the molten metal is poured when the furnace is tilted about a central or lip axis.

Two round carbon rods 7, for example carbon rods of a type used as arc-furnace electrodes, are inserted horizontally side by side and transversely of the chamber 2 beneath the surface of the metal. Each rod is supported, so as to be slidable through the refractories 8 of the furnace wall, by means of a telescopic tubular mounting comprising an internal tube 9 which is attached to the outside of the wall, or to the steel shell of the furnace, and through which the rod 7 is slidable and an external tube 10 to which the rod is attached at their outer ends and which can be screwed over the tube 9 to introduce the said rod into the bath 11 of molten metal to a required extent.

The external tube 10 may be provided with means for turning it manually, say by a tommy bar 12, or by mechanical means. The tube 10 may be provided with a quick release cover 13 at its outer end to enable a fresh carbon rod 7 to be loaded prior to insertion in to the furnace.

To protect the carbon rods 7 from being damaged when pig iron and scrap are introduced by way of flue 3, two small access ports 14 (FIGURE 2) may be provided one in each furnace wall, through which a protective steel rod 15 is introduced so as to extend across the lower end of the flue 3 during the charging period. A simple linkage system, forming an inter-locking device, may be provided to ensure that the rod 15 must be in position before the charging door 4 can be opened. The interlocking device may also be arranged to ensure that the rod 15 must be removed before the door 4 can be closed.

I claim:

1. A reverberatory furnace for ferrous metal, comprising a bottom wall and side walls forming a container for a bath of metal, one of said side walls having a burner opening above the level of the metal for heating the metal from above, one of said side walls also having a lower opening below the level of the upper surface of the metal bath and means for introducing a continuous self-supporting solid rod of carbon substantially horizontally into said bath through said lower opening completely below the level of the metal in said container for supplying carbon to the metal, whereby said carbon is supplied from a position not subject to being coated and insulated from the metal by floating slag, nor to the destructive effect of the flame from the burner.

2. A furnace according to claim 1, and in which said carbon introducing means is provided with means for adjusting the extent to which said carbon rod projects into the bath metal.

3. A furnace according to claim 1, and in which said means for introducing the carbon rod comprises a telescopic tubular mounting on the outer side of said side walls at said lower opening.

4. A furnace according to claim 1, and in which said means for introducing said carbon rod through said lower opening comprises a telescopic tubular mounting having an inner tube and an outer tube screwed on in the other.

5. A furnace according to claim 1, wherein means is provided for protecting the carbon rod against the charge during the period of charging of the furnace.

6. A furnace according to claim 1, and in which the furnace is provided with a flue through which it is charged, and in which means is provided for the insertion of a removable protective rod to extend across the lower end of the flue during the charging period to protect the carbon rod.

References Cited by the Examiner

UNITED STATES PATENTS

| 165,929 | 7/75 | Hudson | 266—34 |
|---|---|---|---|
| 176,787 | 5/76 | Hudson | 75—48 X |
| 1,051,065 | 1/13 | Benjamin | 75—45 |
| 2,436,124 | 2/48 | Sklenar | 75—43 |
| 2,755,180 | 7/56 | De Laval | 75—53 |
| 2,879,156 | 3/59 | Hurum | 75—53 |

FOREIGN PATENTS

| 521,592 | 2/56 | Canada. |
|---|---|---|
| 17,382 | 1909 | Great-Britain. |

BENJAMIN HENKIN, *Primary Examiner.*